United States Patent
Frisken et al.

(10) Patent No.: US 9,158,072 B2
(45) Date of Patent: Oct. 13, 2015

(54) MULTICAST OPTICAL SWITCH

(71) Applicant: Finisar Corporation, Horsham, PA (US)

(72) Inventors: Steven James Frisken, Vaucluse (AU); Thomas Killin, West Ryde (AU)

(73) Assignee: Finisar Corporation, Horsham, PA (US)

( * ) Notice: Subject to any disclaimer, the term of this patent is extended or adjusted under 35 U.S.C. 154(b) by 0 days.

(21) Appl. No.: 14/352,069

(22) PCT Filed: Oct. 27, 2012

(86) PCT No.: PCT/US2012/062334
§ 371 (c)(1),
(2) Date: Apr. 16, 2014

(87) PCT Pub. No.: WO2013/066778
PCT Pub. Date: May 10, 2013

(65) Prior Publication Data
US 2014/0254982 A1 Sep. 11, 2014

Related U.S. Application Data

(60) Provisional application No. 61/553,281, filed on Oct. 31, 2011.

(51) Int. Cl.
*G02B 6/28* (2006.01)
*G02B 6/35* (2006.01)
(Continued)

(52) U.S. Cl.
CPC ............ *G02B 6/3518* (2013.01); *G02B 6/2773* (2013.01); *G02B 6/3556* (2013.01);
(Continued)

(58) Field of Classification Search
CPC .... G02B 6/272; G02B 6/2773; G02B 6/3518; G02B 6/3538; G02B 6/3592
USPC ................................................ 385/16–18, 24
See application file for complete search history.

(56) References Cited

U.S. PATENT DOCUMENTS 6,275,312 B1 * 8/2001 Derks et al. ...................... 398/9
6,366,335 B1    4/2002 Hikmet et al.
(Continued)

OTHER PUBLICATIONS

Ali, Maher, et al, Cost-Effective Implementation of Multicasting in Wavelength-Routed Networks, Journal of Lightwave Technology, Dec. 2000, pp. 1628-1638, vol. 18, No. 12, IEEE.
(Continued)

*Primary Examiner* — Ryan Lepisto
(74) *Attorney, Agent, or Firm* — Kurt Rauschenbach; Rauschenbach Patent Law Group, LLC

(57) ABSTRACT

An optical switch configured to switch optical beams between one or more first ports and two or more second ports includes a wavelength independent beam splitter that simultaneously splits the optical beams from each of the first ports into a plurality of separate sub beams. A reflective wavelength independent switching unit selectively reflectively direct each the sub beam along respective predetermined trajectories such that predetermined sub beams are coupled between the first and second ports. The switching unit includes one independently switchable reflective element corresponding to each second port where each switchable reflective element is switchable between a plurality of preselected switching states and each switching state defines a trajectory of each of the sub beam. The beam splitter and the switching unit are configured to direct the sub beams along substantially free space trajectories unconfined to waveguides.

24 Claims, 13 Drawing Sheets

(51) Int. Cl.
*G02B 6/27* (2006.01)
*G02F 1/01* (2006.01)
*G02F 1/31* (2006.01)

(52) U.S. Cl.
CPC .............. *G02B6/3592* (2013.01); *G02B 6/272* (2013.01); *G02B 6/2793* (2013.01); *G02F 1/0136* (2013.01); *G02F 1/31* (2013.01)

(56) References Cited

U.S. PATENT DOCUMENTS

| | | | | |
|---|---|---|---|---|
| 6,452,702 | B1 * | 9/2002 | Wu et al. | 398/65 |
| 7,031,611 | B2 * | 4/2006 | Valette | 398/96 |
| 2009/0180779 | A1 | 7/2009 | Boduch et al. | |
| 2011/0164876 | A1 | 7/2011 | Fujita et al. | |
| 2011/0234951 | A1 | 9/2011 | Cohen et al. | |

OTHER PUBLICATIONS

"Notification of Transmittal of the International Search Report and the Written Opinion of the International Searching Authority, or The Declaration" for PCT/US12/062334, Jan. 24, 2013, 12 pages, The USPTO, Alexandria, VA.

"Notification Concerning Transmittal of International Preliminary Report on Patentability (Chapter I of the Patent Cooperation Treaty)" for PCT/US2012/062334, May 28, 2015, 9 pages, The International Bureau of WIPO, Geneva, Switzerland.

* cited by examiner

MULTICAST OPTICAL SWITCH

CROSS-REFERENCE TO RELATED APPLICATION

This application is a 35 U.S.C. §371 application based on PCT/US2012/062334 filed Oct. 27, 2012, entitled "Multicast Optical Switch" which claims priority to U.S. Provisional Patent Application Ser. No. 61/553,281, filed Oct. 31, 2011, entitled "Multicast Optical Switch". The entire disclosures of these applications are incorporated herein by reference.

FIELD OF THE INVENTION

The present disclosure relates to optical switching devices and in particular to a wavelength independent multicast-type optical switch for routing optical signals from a plurality of input fibers to a plurality of output fibers. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Optical or photonic switches are central components in optical networks and provide routing of optical signals from a source to a destination in the purely optical domain. Optical switches can be divided broadly into two main categories: wavelength selective switches and wavelength independent switches.

Wavelength selective switches provide capability for switching specific wavelength channels within wavelength division multiplexed (WDM) signals and are generally more complex and expensive devices. A specific type of wavelength selective switch is a Reconfigurable Optical Add-Drop Multiplexer (ROADM), which is capable of multiplexing and demultiplexing a WDM signal to dynamically add or drop particular wavelength channels.

U.S. Pat. No. 6,718,082 to Zhao and Lin, entitled "Solid-State optical wavelength switches" discloses a solid-state polarization-rotation based optical switch that has wavelength selective functionality. Wavelength selectivity is achieved by passing light through a birefringent crystal filter, which selectively rotates the polarization of one wavelength of light by 90° with respect to another wavelength, thereby providing separate routing of the wavelengths. Zhao and Lin is a passive type switch wherein the beams are split and routed to the output ports without active switching to select a specific output port. Further, Zhao and Lin is limited to a 1×2 type switch.

Another known types of wavelength selective switch include those disclosed in U.S. Patent Application Publication US 2009/0180779 A1 to Boduch and Papakos, entitled "Methods and apparatus for performing directionless wavelength addition and subtraction within a ROADM based optical node" and Maher and Deogun, "*Cost-Effective Implementation of Multicasting in Wavelength-Routed Networks*", Journal of Lightwave Technology, Vol. 18, No. 12, December 2000. The former discloses a reconfigurable optical add/drop multiplexer, while the latter proposes a wavelength selective multicast type optical cross connect at an architectural level.

These and other known wavelength selective switches involve demultiplexing wavelength channels of predetermined spectral dimensions and subsequently switching those individual channels. Therefore, these types of switch are not capable of switching signals having variable or arbitrary channel plans.

Wavelength independent switches, on the other hand, provide more flexible routing of optical signals between nodes of a network where knowledge of individual channel spectral dimensions is not required. For example, where groups of channels are concurrently routed. US Patent Application Publication 2011/0164876 A1 to Fujita et al. entitled "Directionless Reconfigurable Optical Add/Drop Multiplexer" (assigned to Enablence USA Technologies Inc.) discloses an N×M optical switch system including a generic optical splitter coupled to each of the N input fibers for splitting each of the N input signals into M or fewer sub signals. The M sub signals are received by M generic optical N×1 switches, which are each capable of selecting one of the N input signals for output. In the case of multiplexed input signals, the signals output from the switches are passed through filters to produce demultiplexed, single-wavelength output signals.

While Fujita et al. discloses a general architecture for providing N×M switching, it is cast at a functional level and does not provide component level implementation details. As such, important factors such as polarization independence, switching extinction, manufacturing complexity and cost are not considered. Further, Fujita et al. require the components to be "optically connected". In the illustrated architectures, components such as optical filters, amplifiers and the like are included, which would likely limit the optical connections to physical waveguides such as optical fibers. This restriction, which is common to many wavelength selective and wavelength independent designs, has particular performance drawbacks and requires each input fiber to have a corresponding beam splitter and individual N×1 optical switches.

Therefore, there is a general desire for low cost non-complex optical switches.

SUMMARY OF THE INVENTION

It is an object of the present disclosure, in its preferred form to provide an improved or alternative wavelength independent optical switch.

In accordance with a first aspect of the present disclosure there is provided an optical switch for switching optical beams between one or more first ports and two or more second ports, said switch including:
  a wavelength independent beam splitter for splitting said optical beams from each of said first ports into a plurality of separate sub beams; and
  a wavelength independent switching unit for selectively directing each said sub beam along respective predetermined trajectories such that predetermined sub beams are coupled between said first and second ports;
  wherein said beam splitter and said switching unit are configured to direct said sub beams along substantially free space trajectories unconfined to waveguides.

The beam splitter preferably simultaneously splits each of a number of optical beams into a plurality of separate sub beams.

The optical switch preferably includes first and second polarization manipulating elements for respectively separating and recombining constituent orthogonal polarization states of each optical beam such that each polarization state traverses the beam splitter and the switching unit separately.

The beam splitter preferably includes one or more polarization beam separating elements. The beam separating elements are preferably selected from the group comprising spatial walk-off crystals, birefringent wedges and polarization beam splitters. The beam splitter preferably includes one or more pairs of birefringent wedges, the wedge pairs being situated adjacent one another and providing opposing material birefringent effects such that beams incident onto one of the wedge pairs are split into two angularly separated sub beams.

The birefringent wedge pairs preferably each have a predefined birefringent axis and the axes of adjacently disposed wedge pairs are oriented relatively at 45°. Each subsequent wedge pair preferably provides a larger angular separation of the sub beams.

The switching unit preferably includes one independently switchable element corresponding to each said second port. In one embodiment, the switching unit preferably includes a liquid crystal on silicon (LCOS) device having a two-dimensional array of individually addressable pixels, predefined subsets of the pixels being configured to steer sub beams to corresponding second ports. In a further embodiment, the switching unit preferably includes an array of independently tiltable micro-electromechanical system (MEMS) mirrors having one mirror corresponding to each second port.

In this latter embodiment, the MEMS mirrors are preferably selectively tiltable into a plurality of preselected switching states, each switching state defining a trajectory of each sub beam. The number of switching states is preferably equal to the number of first ports, such that the particular switching state of each MEMS mirror determines the particular first port from which a sub beam will be coupled to a corresponding second port.

The beam splitter preferably splits each optical beam into first and second groups of angularly separated sub beams, each sub beam within a respective group having a common polarization state that is orthogonal to the polarization state of the sub beams within the other group, the orthogonally polarized first and second groups being directed onto separate mirrors of the MEMS array.

The optical switch preferably includes a polarization modifying element for modifying the polarization state of the first group of sub beams such that the first and second groups of sub beams have the same polarization state. The polarization modifying element preferably includes a quarter-wave plate located adjacent the MEMS array such that the first group of sub beams is passed through the quarter-wave plate before and after reflection from the MEMS array.

The optical switch preferably further includes:
a first walk-off crystal disposed before or within the beam splitter for spatially separating orthogonal polarization components of the optical beams; and
a second walk-off crystal downstream of the switching unit for recombining the orthogonal polarization components.

The beam splitter is preferably configured such that the polarization components emerge from the beam splitter as pairs of parallel sub beams having the same polarization state and forming the first and second groups of angularly separated sub beams.

The optical switch preferably further includes a half-wave plate located adjacent and upstream of the second walk-off crystal for changing the polarization of a subset of the sub beams to an orthogonal state to thereby allow spatial recombination of all sub beams corresponding to a particular optical beam. The optical switch preferably includes a first optical power element configured for collimating the sub beams onto said switching unit. The first optical power element is preferably also configured to focus both polarization components onto a single MEMS mirror. The optical switch preferably further includes a second optical power element for collimating the sub beams prior to coupling to the second ports The optical switch preferably includes 4 first ports and 16 second ports.

The optical switch is preferably bidirectional in operation such that, in a first operational direction, optical beams can be switched from the first ports to predetermined ones of the second ports and, in a second operational direction, optical beams can be switched from the second ports to predefined first ports. The optical switch is preferably simultaneously bidirectional in operation such that optical beams from a first subset of the first ports are switched to a first subset of the second ports at the same time as sub beams from a second subset of the second ports are switched to a second subset of the first ports.

The optical switch preferably includes separating means for separating beams from the first and second subsets. The separating means preferably includes at least one polarization modifying element to selectively modify the polarization state of one or more beams. The polarization modifying element preferably includes one or more liquid crystal phase modulator elements configured to individually manipulate predetermined ones of the optical beams.

The separating means is preferably dynamically variable such that the optical switch can be changed between a bidirectional operational mode and a unidirectional operational mode.

The number and trajectory of the sub beams is preferably determined by the number of polarization beam separating elements.

In accordance with a second aspect of the present disclosure, there is provided a method of switching optical beams between one or more first ports and two or more second ports, said method including:
splitting said optical beams into a plurality of separate sub beams in a wavelength independent manner;
defining paths between predetermined ones of said first and second ports for each said sub beam; and
selectively directing each said sub beam along respective said paths such that information contained within each said optical beam is transmitted between respective said first and second ports;
wherein said beam splitter and said switching unit are configured to direct said sub beams along substantially free space trajectories unconfined to waveguides.

In accordance with a third aspect of the present disclosure, there is provided a wavelength independent beam splitter for receiving an input optical beam and outputting a plurality of sub beams angularly separated according to polarization state, said beam splitter including:
a first polarization dependent beam splitting element for splitting an incident optical beam into two symmetrically angularly separated first order sub beams having orthogonal polarization states; and
a second polarization dependent beam splitting element for further splitting each said orthogonal sub beam into two angularly separated second order sub beams, thereby defining four angularly separated sub beams, each said second order sub beam having polarization states orthogonal to their respective originating first order sub beam.

The beam splitter preferably further includes a third polarization dependent beam splitting element, which further splits each second order sub beams into two angularly separated third order sub beams, each third order sub beam having polarization states orthogonal to their respective originating second order sub beam.

The beam splitter preferably further includes a fourth polarization dependent beam splitting element, which further splits each third order sub beams into two angularly separated fourth order sub beams, each fourth order sub beam having polarization states orthogonal to their respective originating third order sub beam.

The beam splitter is preferably configured such that each fourth order sub beam has substantially equal power. The beam splitter is preferably further configured such that the fourth order sub beams are output into two angularly separated groups and wherein each sub beam of a group has a common polarization state that is orthogonal to the sub beams of the other group. Furthermore, the beam splitter is preferably configured such that each order of sub beam is angularly deflected at an angle that depends upon the incident angle of the previous order sub beam onto a respective beam splitting element.

The polarization dependent beam splitting elements are preferably birefringent wedge pairs having a predefined birefringent axis, each wedge pair having its birefringent axis oriented at 45° to the preceding wedge pair.

The wavelength independent beam splitter is preferably configured to simultaneously split a plurality of input optical beams into a plurality of output sub beams angularly separated according to polarization state.

In accordance with a fourth aspect of the present disclosure, there is provided an optical multiplexer for mapping a series of optical input ports to a series of optical output ports in a controlled manner, said multiplexer including:
- a series of input ports for emitting one or more optical signals;
- an optical power splitting element for splitting each said optical signal into subcomponent signals;
- a first optical power element for collimating said subcomponent signals onto a directional element, and for refocusing said subcomponent signals;
- a directional element for providing a controllable directional projection to said subcomponent signals to provide directed subcomponent signals;
- a second optical power element for collimating said directed subcomponent signals for coupling to said optical output ports.

BRIEF DESCRIPTION OF THE DRAWINGS

Preferred embodiments of the disclosure will now be described, by way of example only, with reference to the accompanying drawings in which.

DETAILED DESCRIPTION

Figure 1:
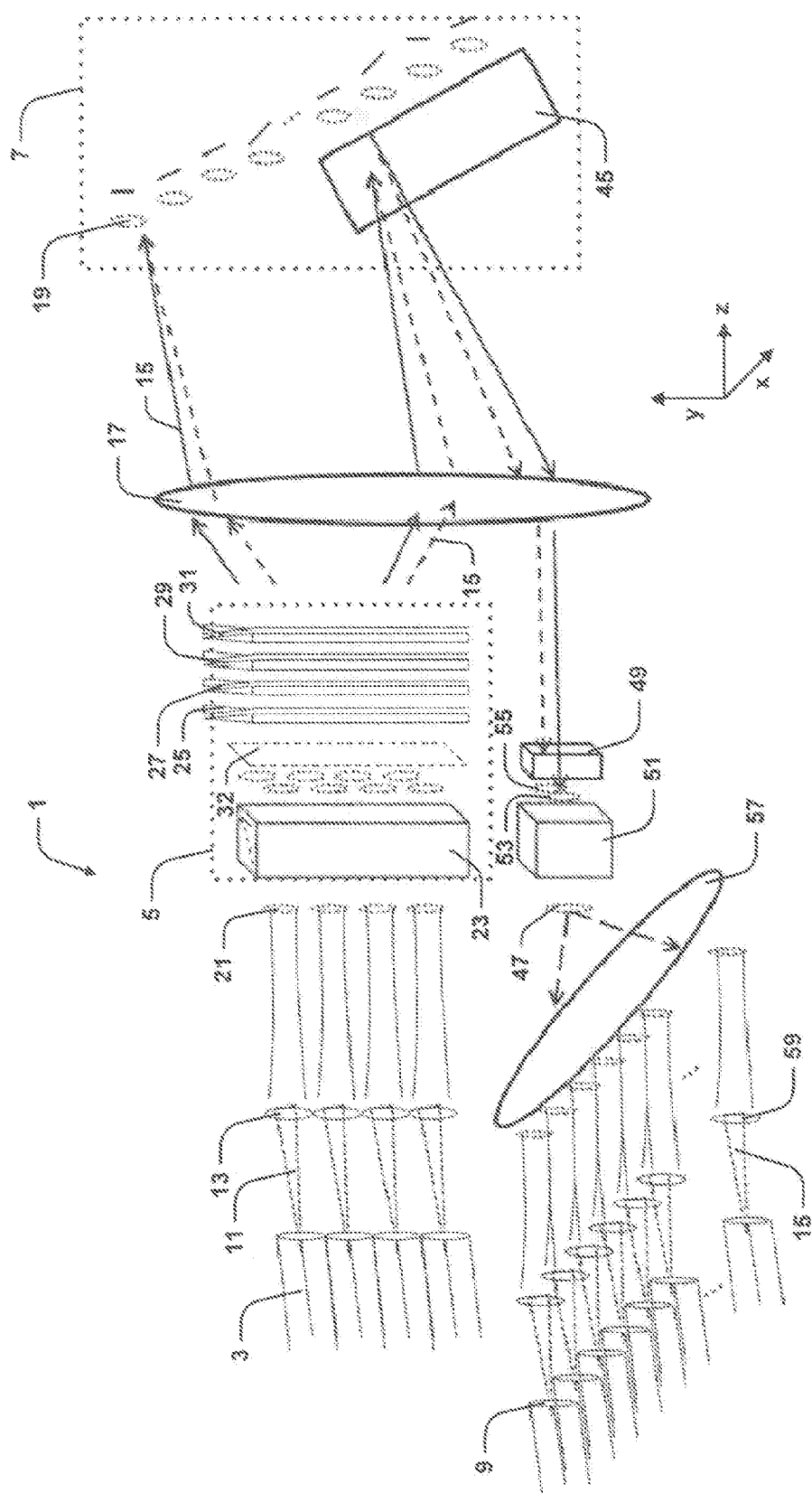
FIG. 1 is a schematic illustration of a multicast optical switch according to a first embodiment incorporating a 4-by-16 fiber arrangement.

Referring to FIG. 1, there is illustrated an optical switch 1, including 4 common port optical fibers e.g. 3, disposed in a vertical y dimension, a wavelength independent beam splitter 5, a switching unit 7 and 16 add/drop optical fibers e.g. 9, disposed in a horizontal x dimension. In one direction of operation, the common port fibers 3 project respective optical beams e.g. 11 through corresponding micro lenses e.g. 13 to beam splitter 5, which physically splits each optical beam 11 into a plurality of separate sub beams e.g. 15. The sub beams 15 are focused by a lens 17 onto respective micro-electromechanical (MEMS) mirrors e.g. 19 of switching unit 7. Mirrors 19 are tiltable in a controlled manner to direct each said sub beam 15 along respective predetermined trajectories to thereby selectively couple the sub beams 15 back through lens 17 to corresponding add/drop optical fibers 9. Switch 1 is capable of switching, to each add/drop fiber 9, a single sub beam from one of the 4 common port fibers 3. Corresponding operation occurs in the reverse direction, with add/drop fibers 9 acting as input ports and common port fibers 3 providing outputs.

Referring still to FIG. 1, in a first direction of operation, optical beams 11 are input from common port fibers 3, which, in one embodiment are disposed in a linear array having a pitch of about 250 μm. In other embodiments, common port fibers 3 are disposed in other arrangements and with different spacings. The optical beams 11 are incident through respective micro lenses of array 13 to confine the beam to a spot 21 of predetermined size. In one embodiment, the beam spot 21 has a size of about 140 μm in the x dimension and about 70 μm in the y dimension. Beams 11 are then passed through beam splitter 5. In the illustrated embodiment, splitter 5 includes a walk-off crystal 23 and 4 pairs of birefringent wedges 25, 27, 29 and 31. Element 32 is shown as a dashed line as it is optional in switch 1. Explanation of this element is deferred until later in this document, where it is discussed in relation to defining an operating configuration of switch 1.

The operation of beam splitter 5 will be described with reference to FIG. 2, which illustrates a plan view of splitter 5 showing the transmission of a single beam 33 therethrough. It will be appreciated that corresponding propagation through beam splitter 5 occurs simultaneously for the other 3 beams incident from other common port fibers 3.

While walk-off crystal 23 is illustrated as part of beam splitter 5, its function relates to polarization control and not specifically to beam splitting for the purpose of switching. Therefore, walk-off crystal 23 can be considered separate to beam splitter 5. However, for the purpose of illustrating the beam propagation and geometry through splitter 5, walk-off crystal 23 is considered concurrently. Further, while the optical elements are shown separated in space, in practice it is typical to have these elements as close to each other as possible. In one particular embodiment, beam splitter 5 has a total length of about 5 mm along the optical z axis.

Figure 2:
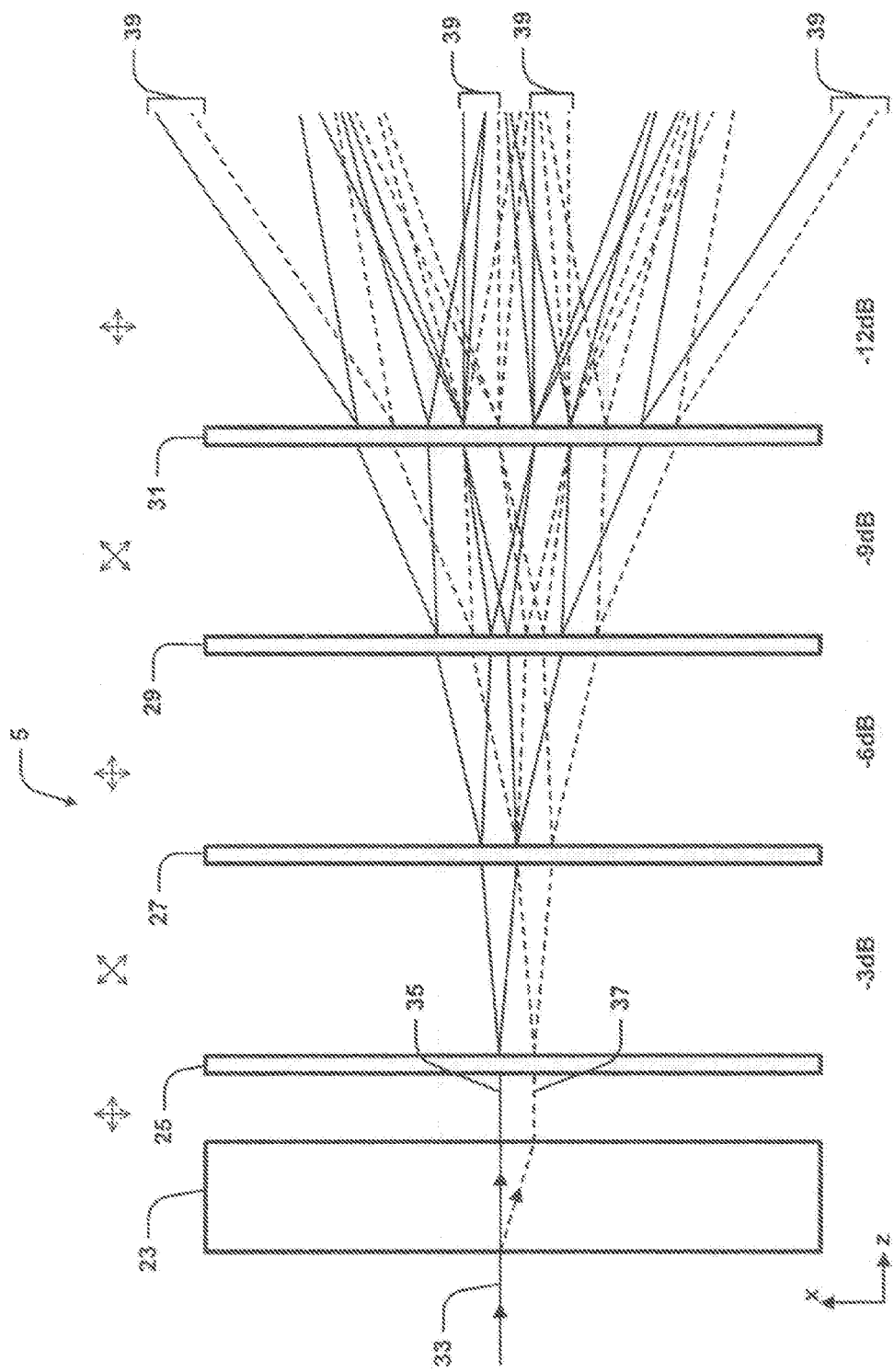
FIG. 2 is a schematic plan view of the beam splitter of the optical switch of FIG. 1, showing the transmission of a single input optical beam through the beam splitter.

Referring specifically to FIG. 2, walk-off crystal 23 initially splits beam 33 into two parallel beams 35 and 37 spatially separated in the horizontal x dimension and having substantially equal power but orthogonal polarization states. In other embodiments, walk-off crystal 23 is configured to split the polarization states of beam 33 in dimensions other than horizontal. In further embodiments, walk-off crystal 23 is replaced by one or more birefringent wedges and the beams may be split angularly, in addition to, or as opposed to spatially. In FIG. 2 and subsequent figures, the sub beams originating from the two polarization components 35 and 37 are differentiated by their different representation as solid and dashed lines respectively.

Referring still to FIG. 2, the orthogonally polarized and spatially separated sub beams 35 and 37 are incident onto first birefringent wedge pair 25, which is configured such that each polarization state is angularly separated in the horizontal x dimension into two orthogonally polarized beams of substantially equal power. This situation is achieved by orienting the extraordinary or slow axis of the wedge pair 25 at 45° to each of the polarized sub beams 35 and 37. The slow axis of each wedge of the pair 25 is oriented in opposite directions such that one polarization component is angled upward in the x dimension and the other component is angled downward in the x dimension. This process is repeated for wedge pairs 27, 29 and 31, with each wedge pair oriented at 45° to the previous wedge pair and each subsequent pair providing a larger angular separation. This configuration results in each respective wedge pair further angularly separating each polarization component into orthogonal components having different orientations. Example polarization states of the respective sub beams are shown at the top of FIG. 2.

In passing through each wedge pair in beam splitter 5, the number of sub beams is doubled. At the output of splitter 5, there are a total of 32 sub beams, divided into 16 angularly separated pairs 39 of parallel beams. The sub beams of each parallel beam pair 39 correspond to the two orthogonal polarization components 35 and 37 initially separated by walk-off crystal 23. As these two components are separated in space but collimated, they propagate parallel through the wedge pair system and maintain the same spatial offset in the x dimension. However, at the output, they both have the same polarization state. For clarity, the angular separation of sub beams has been exaggerated in FIG. 2 and, in practice, the angular separation is quite small. For example, in one implementation, wedge pair 25 splits the sub beams by an angle of about 1.74 deg.

In the illustrated embodiment of FIG. 2, consecutive wedge pairs are configured to provide an increasingly larger angular polarization separation, with pair 25 providing the smallest angular separation and pair 31 providing the largest angular separation. This arrangement provides the useful distribution of sub beams into 16 angularly separated pairs of parallel beams. In one embodiment, the wedge pairs are configured such that the tangent of the angle ($\tan \theta$) doubles for each subsequent wedge pair. However, it will be appreciated that wedge pairs 25, 27, 29 and 31 can be configured to angularly separate the sub beams in other arrangements and at other angles.

The output angle of deviation of a particular polarization state from each wedge pair is dependent upon the incident angle onto that wedge pair. For example, considering an initial wedge pair deflection of $\pm\theta$, the angles of deflection from a second wedge pair, that provides a deflection of $\pm\phi$, are $\theta+\phi$; $\theta-\phi$; $\phi-\theta$; $-\theta-\phi$. Therefore, after the second wedge pair 27, the sub beams of each polarization component 35 and 37 are separated into four different angles. After the fourth wedge pair 31 the beams are separated into the abovementioned 16 beam pairs 39, with each pair having two parallel orthogonally polarized beams.

At each beam splitting through a wedge pair, the optical power is halved and there is an associated 3 dB loss. For the illustrated system, having 4 wedge pairs, there is an associated 12 dB loss in signal power. However, there is no significant loss associated with splitting the polarization states at the walk-off crystal 23 as these are later recombined to form 16 sub beams with full polarization information.

Beam splitter 5 provides the unique functionality of defining a number of angularly encoded sub beams, which can be individually manipulated for switching between common port fibers 3 and add/drop fibers 9. Importantly, the splitting occurs in free space and there is no requirement for the sub beams to be spatially guided by waveguides, fibers or other dispersive media. Furthermore, all optical beams are split simultaneously by the single beam splitter 5. This simultaneous splitting provides cost advantages compared to other known designs, which use individual beam splitters for each input fiber. This arrangement allows switching to also be performed in a free space waveguide free environment. This switching process will now be described.

Returning to FIG. 1, the sub beams from beam splitter 5 are incident onto lens 17, which is preferably spherical with a focal length of about 20 mm in both the x and y dimensions. These parameters are exemplary only and, in other embodiments, lens 17 can have different focal lengths and may not be strictly spherical. In a further embodiment, lens 17 is replaced with a cylindrical lens having an equivalent focal length and MEMS mirrors 19 can be located appropriately to receive light reflected from that mirror.

Lens 17 is located at a distance of about one focal length, or 20 mm, from arbitrary point 21 in the optical system where the beam spot size is well defined and also one focal length, 20 mm, from MEMS mirrors 19 along the optical x axis. Such placement of the optical elements in the focal planes of a lens acts to convert collimated beams to focused beams and vice versa. MEMS mirrors 19 are disposed in the x dimension, which is the dimension of beam separation from splitter 5, and mirrors 19 are configured to switch in the y dimension. However, in other embodiments, different switching configurations can be implemented, with common port fibers 3 and add/drop fibers 9 disposed in other arrangements. Add/drop fibers 9 are preferably disposed in a linear array having a pitch of about 250 μm. However, in other embodiments, other add/drop fiber spacing and configurations are possible.

Figure 3:
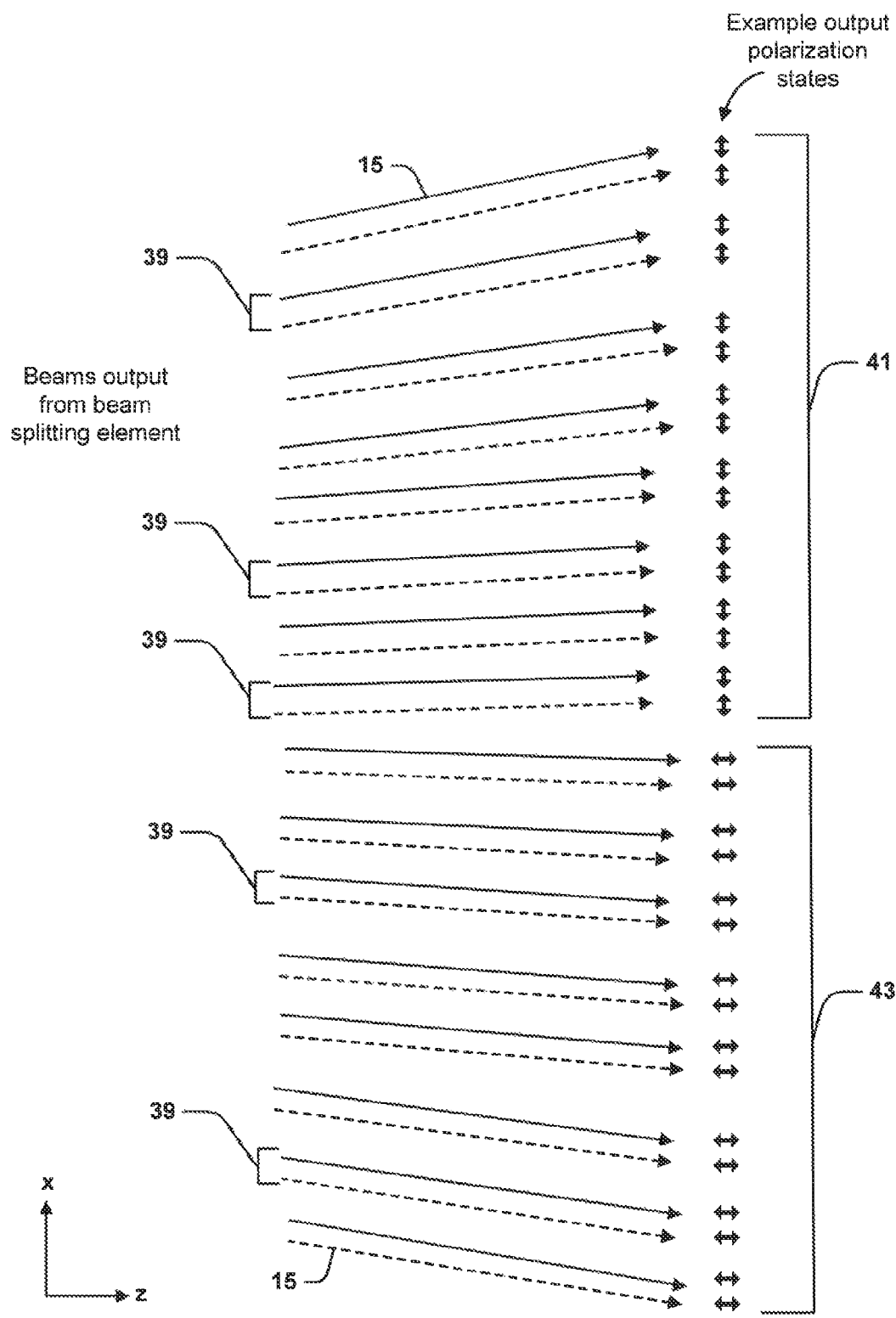
FIG. 3 is a ray diagram showing the geometry of beams exiting the beam splitter of FIG. 2.

Propagation through each wedge-pair in beam splitter 5 rotates the polarization states of each beam by substantially 45° and the output beams are angularly separated into two orthogonal polarizations. Therefore, at the output of splitter 5, the first 8 sub beam pairs are polarized orthogonal to the second 8 sub beam pairs due to the last wedge pair 31. Example polarization states of beams output from beam splitter 5 are shown in FIG. 3. As illustrated, the sub beams are output in pairs and the pairs are output at different angles in the x-z plane. Due to the angular separation of the last wedge pair 31, the first 8 sub beam pairs are polarized in one orientation (vertical in this example) and the second 8 sub beam pairs are polarized in an orthogonal direction (horizontal in this example), defining two groups 41 and 43.

Referring to both FIG. 1 and FIG. 3, to account for the difference in polarization between the two groups 41 and 43 of sub beam pairs, a quarter-wave plate 45 is inserted adjacent 8 of the MEMS mirrors 19 and positioned to receive the 8 sub beam pairs of group 43. Transmission and reflection (two passes) through quarter-wave plate 45 changes the polarization of the sub beams incident onto those mirrors into the orthogonal state. Therefore, on the return from MEMS mirrors 19, all of the sub beams have the same polarization state.

Figure 4:
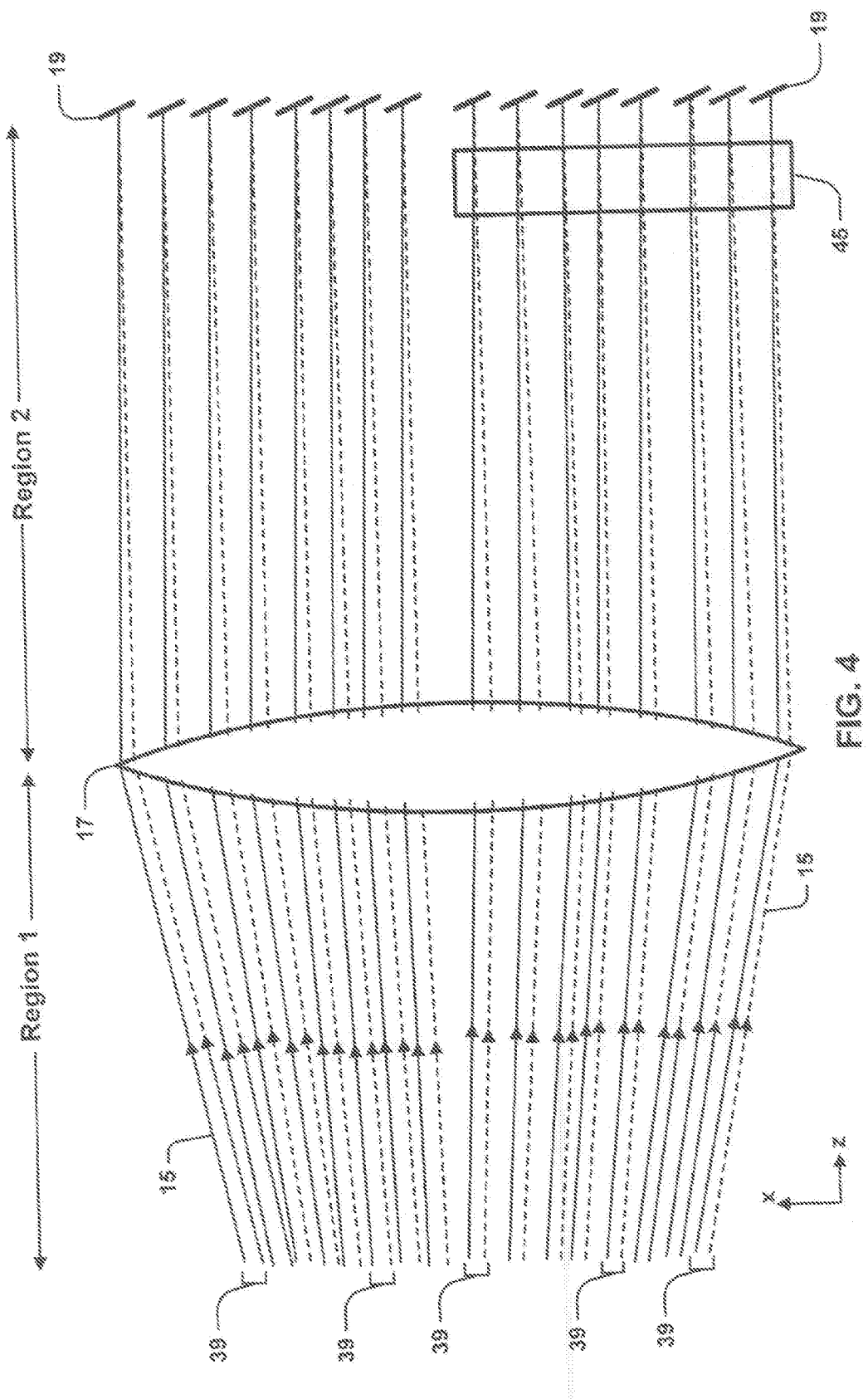
FIG. 4 is a plan view of a lens and MEMS mirrors in the optical switch of FIG. 1 and ray diagram showing the propagation of sub beams through the lens.

Referring now to FIG. 4, there is illustrated a ray diagram of the 16 beam pairs passing through lens 17 and incident onto MEMS mirrors 19. The symmetric positioning of lens 17 between point 21 and the MEMS mirrors 19 at the lens' focal length provides optical symmetry and collimates each of the 16 beam pairs 39 for parallel incidence onto respective MEMS mirrors. Simultaneously, the previously collimated sub beams within each pair are focused together by the lens onto a single MEMS mirror.

With reference still to FIG. 4, the horizontal x dimension beam characteristics prior to propagation through lens 17 (Region 1) and after propagation through lens 17 (Region 2) can be summarised as follows:

|  | Region 1 | Region 2 |
|---|---|---|
| Beam Pairs | Diverging | Collimated |
| Sub beams of each pair | Collimated | Focused |

Due to symmetry, these characteristics are equivalent on the return trip after reflection from the MEMS mirrors 19. However, the polarization state of group 43 of sub beam pairs changes on the return path due to the presence of quarter-wave plate 45. The symmetric axial positioning of lens 17 also has advantages associated with controlling beam spot sizes, as described below.

As shown in FIG. 4, in the y dimension, lens 17 converges the sub beams from each common port fiber 3 such that each set of 16 beam pairs are incident onto MEMS mirrors 19. Four separate sets of these 16 beam pairs are incident onto mirrors 19; one for each common port fiber 3. Choice of which of the four sub beam pairs to couple to each add/drop port 9 is made by setting each MEMS mirror to a desired one of 4 possible switching states. Each switching state is defined by a specific mirror tilt angle in the y dimension that couples, to a corresponding add/drop fiber 9, an incident sub beam from a specific common port fiber 3. For example, to route an optical beam from a second common port fiber to a tenth add/drop fiber, the tenth MEMS mirror is set to a second predefined tilt angle. The remaining three beams incident onto the tenth MEMS mirror are not coupled to an add/drop fiber. Similarly, in the reverse direction, to route an optical beam from a third add/drop fiber to a first common port fiber, the third MEMS mirror is set to a first predefined tilt angle.

In embodiments having different numbers of common port fibers 3, the number of switching states is equal to the number of common port fibers. In other embodiments, the number of switching states of each MEMS mirror is greater than the number of common port fibers. In these latter embodiments, one or more tilt angles are defined such that no coupling occurs between the common port fibers 3 and a particular add/drop fiber 9.

Returning to FIG. 1, sub beams reflected from MEMS mirrors 19 are returned through lens 17. After passing again through lens 17, in the horizontal x dimension the sub beams of each sub beam pair 39 are re-collimated and pairs 39 are collectively focused together to a focal point 47. In the y dimension, the four separate arrays of 16 sub beams are collectively collimated but each sub beam is encoded with an additional angle defined by the switching state of the corresponding MEMS mirror. Focal point 47 is symmetrically equivalent to focal point 21 in the optical switch.

Prior to reaching point 47, the sub beams are passed through a half-wave plate 49 and a second walk-off crystal 51. Half-wave plate 49 and walk-off crystal 51 are located close to point 47 such that the 16 sub beam pairs are substantially focused in the x dimension by lens 17. This focusing removes the spatial separation of sub beams and half wave plate 49 essentially receives two sets 53 and 55 of 8 overlapping beams for each vertically separated input optical beam. Each beam set 53, 55 includes the collimated sub beams corresponding to originally orthogonal sub beams 35 and 37 and are displaced in the x dimension by the initial distance set by walk-off crystal 23.

Prior to transmission through half-wave plate 49, the sub beams in each set have the same polarization. Half-wave plate 49 is positioned to receive beam set 55 only and to change the polarization of those sub beams into the orthogonal orientation. This allows walk-off crystal 51 to effectively recombine the two sets 53, 55 of sub beams in the x dimension at point 47. Walk-off crystal 51 preferably possesses substantially the same characteristics as walk-off crystal 23. However, in other embodiments, walk-off crystal 51 has different characteristics and parameters to that of walk-off crystal 23. In a further embodiment, the beams are passed back through walk-off crystal 23 on the return path and walk-off crystal 51 is not required.

Beyond point 47, the sub beams again collectively diverge in the x dimension. A second spherical lens 57 is positioned about 20 mm from point 47 and also about 20 mm from a second array of micro lenses e.g. 59. The focal length of lens 57 is about 20 mm. This symmetric positioning allows lens 57 to collectively collimate the sub beams in the x dimension to the appropriate 250 µm fiber spacing, while collectively converging the four sets of sub beams in the y dimension. Due to the angular encoding in the y dimension at the MEMS mirrors 19, only one of the four sub beams directed towards each add/drop fiber 9 is coupled through the micro lens 59 to the add/drop fiber. Therefore, selective switching of optical beams between common port fibers 3 and add/drop fibers 9 is provided simply by setting the tilt angle of respective MEMS mirrors 19.

Throughout propagation of switch 1, the spot sizes of each beam are carefully controlled to reduce losses and enhance spatial efficiency of the device. Micro lenses 13 confine the beams, at point 21, to elliptical spot sizes (radii) of about 140 µm in the x dimension and about 70 µm in the y dimension (140 µm by 70 µm) before propagation through beam splitter 5. Through symmetry of Gaussian beam propagation, after travelling through spherical lens 17, which is disposed at a distance of about 20 mm from spot 21, the sub beams have inverted elliptical spot sizes. The dimensions of the inverted beam spot sizes at the MEMS mirrors 19, which are located approximately 20 mm from lens 17, is approximately 70 µm by 140 µm. Similarly, in propagating again through spherical lens 17, the sub beam spot sizes are again inverted such that at focal point 47, the spot sizes are again about 140 µm by 70 µm. Finally, after propagation through spherical lens 57, a final inversion occurs, ensuring that spot sizes are 70 µm by 140 µm at micro lenses 59. It will be appreciated that these beam spot values are exemplary only. In practice, other beam spot sizes can be implemented, for example, by changing the size of micro lenses 13 and 59, varying the spacing of the optical elements and utilizing lenses or mirrors with different focal lengths.

It will be appreciated that switch 1 can be scaled to include different numbers of common port fibers 3 and/or add/drop fibers 9. Increasing the number of add/drop fibers 9 requires a corresponding increase in the number of MEMS mirrors 19. Increasing the number of common port fibers 3 requires a corresponding increase in the number of switching states of each MEMS mirror. Using the particular beam splitter 5, the number of wedge pairs also scales up with an increase in the number of add/drop fibers 9. In the illustrated embodiment, 4 wedge pairs split each input optical beam into 16 sub beams. A switch having 32 add/drop fibers would require 5 wedge pairs to selectively couple to all 32 fibers. The general relationship between the number of wedge pairs and add/drop fibers for beam splitter 5 is $N=2^w$, where w is the number of wedge pairs and N is the number of add/drop fibers. However, as will be described below, other forms of beam splitter can be implemented into the optical switch.

Referring again to FIGS. 1 and 2, it will be appreciated that switch 1 can be implemented without walk-off crystals 23 and 51. In such an embodiment, no orthogonal sub beams 35 and 37 or sub beam pairs 39 would be formed and only 16 single sub beams would be output from beam splitter 5. The optical switch would operate in the same manner as describe above, however, less polarization control is available for reducing polarization dependent loss.

Figure 5:
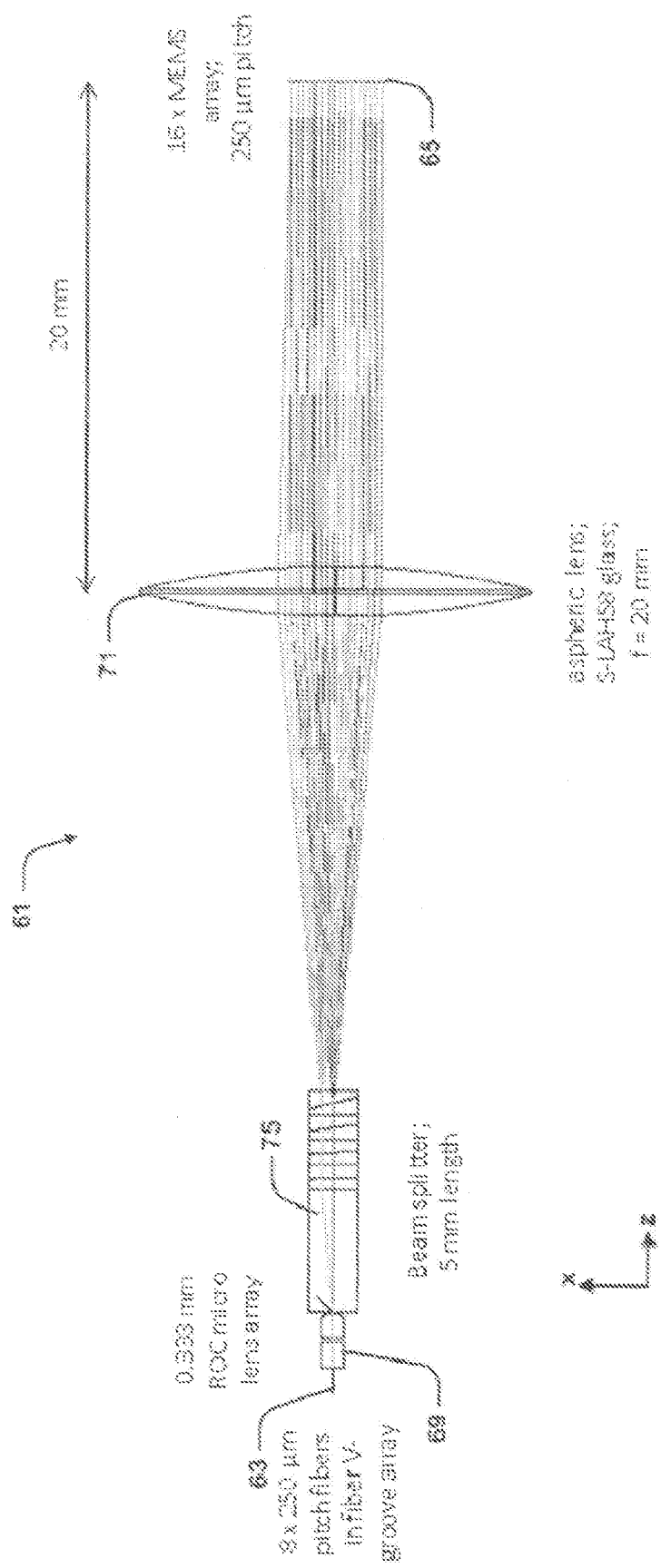
FIG. 5 is a sectional plan view of an optical switch according to a second embodiment implementing an 8-by-16 fiber arrangement, showing a first half of the switch extending from common port fibers to the MEMS mirror array.
Figure 6:
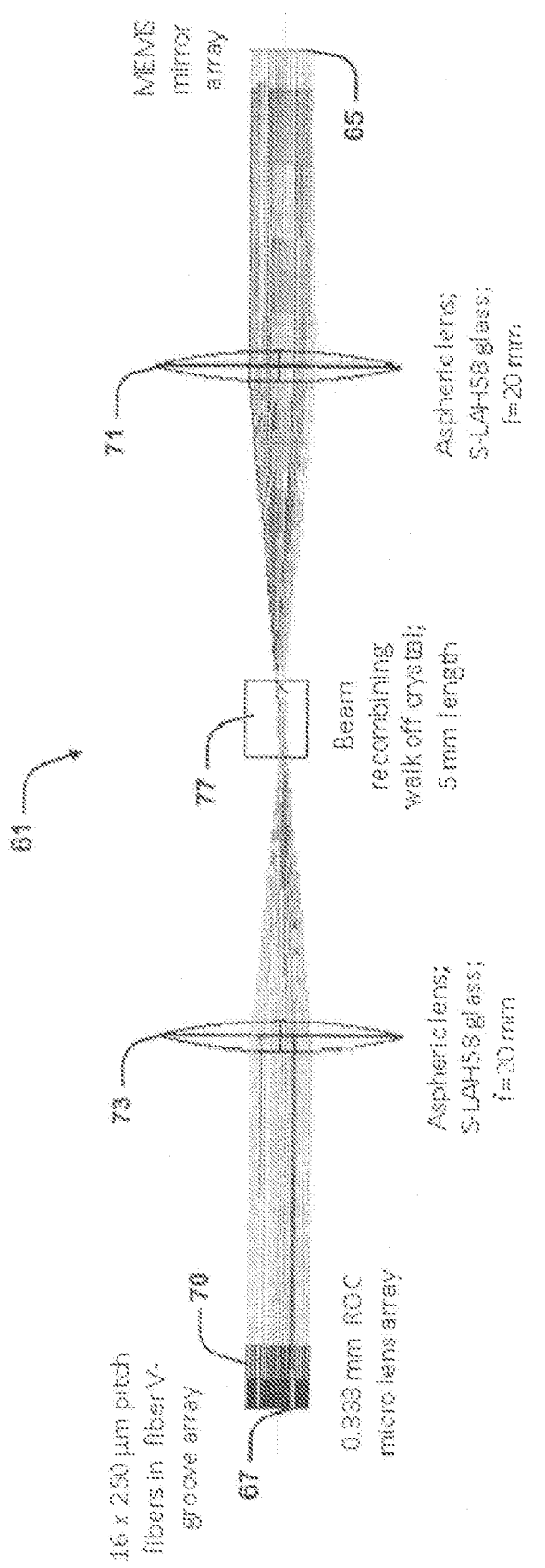
FIG. 6 is a sectional plan view of the second embodiment optical switch, showing a second half of the switch extending from the MEMS mirror array to the add/drop fibers.

Referring now to FIGS. 5 and 6, there is illustrated a plan view of a second embodiment optical switch 61, as modeled in the Zemax optical design software. FIG. 5 shows the optical path from the common port fibers 63 to the MEMS array 65, while FIG. 6 shows the optical path from the MEMS array 65 to the add/drop fibers 67. Operation of switch 61 is primarily equivalent to that of switch 1 described above and will not be repeated in detail. However, details of specific components and parameters are described, in an exemplary sense.

Switch 61 includes 8 common port fibers 63, which are mounted at a spacing of 250 µm in a fiber v-groove array. The 16 add/drop fibers are similarly mounted in a fiber v-groove array at a spacing of 250 µm. Beams from both the common port fibers 63 and add/drop fibers 65 are passed through micro lenses 69, 70 having 0.333 mm radii of curvature. Primary lens 71 is formed of S-LAH58 type glass and is aspheric in shape. The lens is slightly more conic in curvature when compared to a pure spherical lens. This conic shape compensates for optical aberrations. Lens 73 is also formed of S-LAH58 type glass and is aspheric in shape in the same manner as lens 73. Both lenses 71 and 73 have a focal length of 20 mm. MEMS array 65 includes 16 MEMS mirrors spaced linearly with a pitch of about 250 µm. Each mirror is approximately 240 µm by 490 µm in area. Each mirror is tiltable between 8 different switching states for coupling beams between one of the 8 common port fibers 63 and one of the 16 add/drop fibers 67. Beam splitter 75 operates as described above and has a length of 5 mm. Recombining walk-off crystal 77 also has a length of 5 mm.

The simulated performance of switch 61 will now be described with reference to FIGS. 7 to 9. All data are measured for optical beams having a wavelength of 1530 nm. It will be appreciated that these results are dependent upon the specific parameters used and the optical switch can be implemented with a range of alternative parameters and components to perform the same primary switching functionality.

Figure 7:
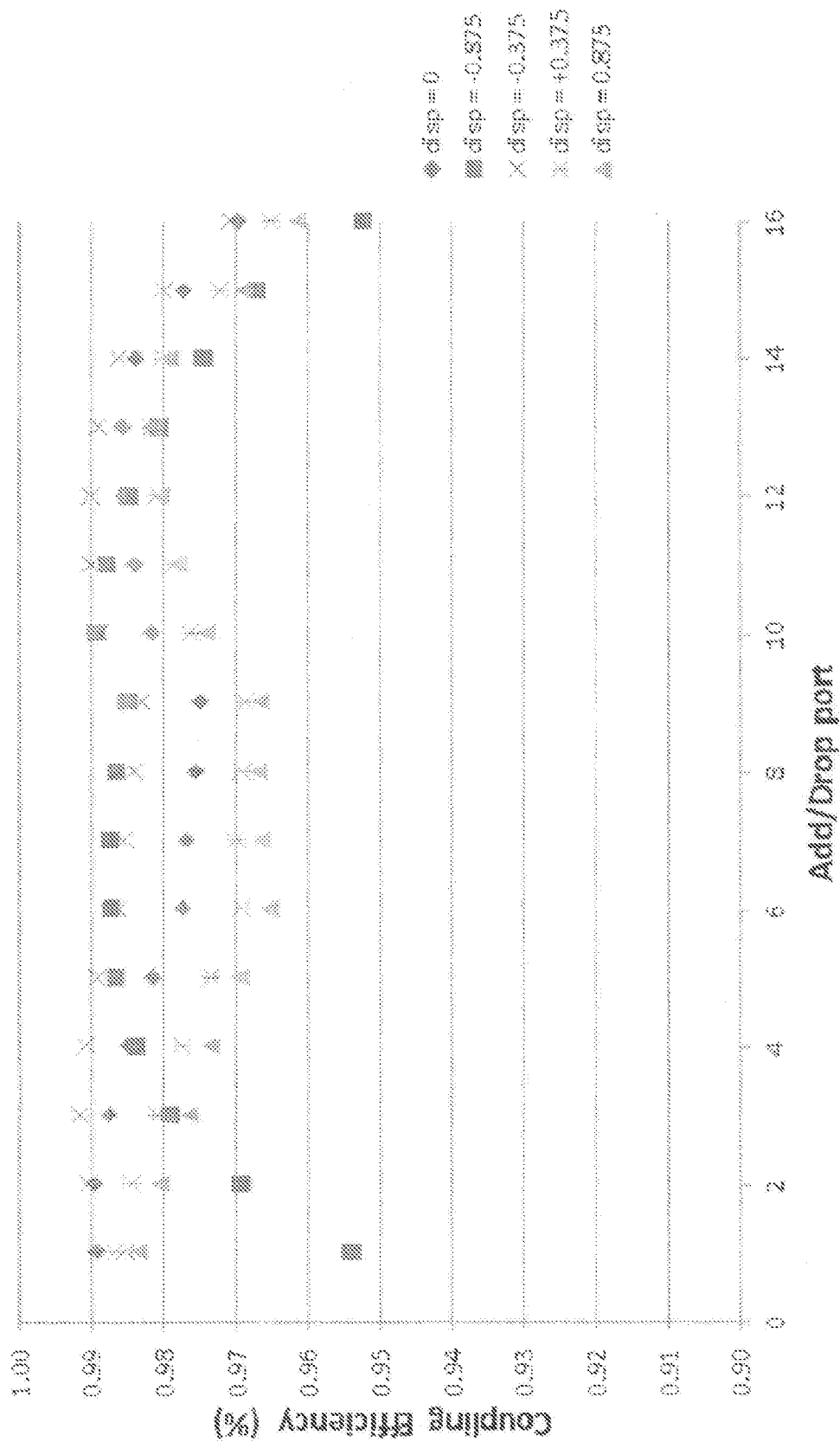
FIG. 7 is a graph of simulated coupling efficiency from selected common port fibers to each add/drop fiber for the second embodiment optical switch.

Referring to FIG. 7, there is illustrated a graph of simulated coupling efficiency of switch 61 to each add/drop fiber 67. The coupling efficiency is measured for several values of common port fiber position (displacement—"disp" in µm) relative to the optical z axis. A displacement of 0 represents a common port fiber located on the optical z axis, while a displacement of 0.875 represents a common port fiber located 0.875 µm from the optical axis. Data are measured for displacements of 0, ±0.375 µm, ±0.875 µm. The efficiency value ignores the 12 dB loss in signal power associated with the splitting of each beam into 16 sub beams. As illustrated, the coupling efficiency is greater than 95% for all measurements.

Figure 8:
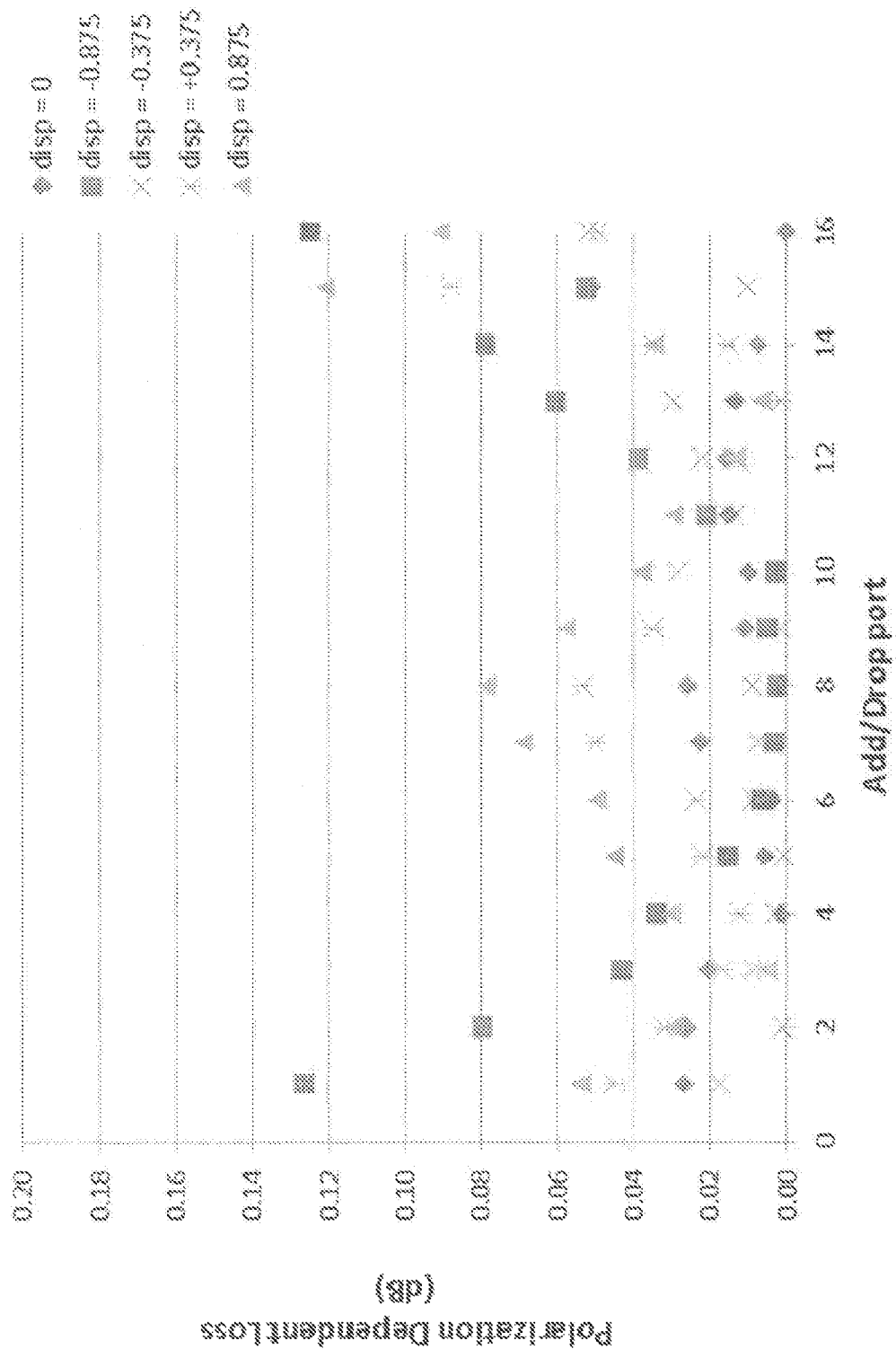
FIG. 8 is a graph of simulated polarization dependent loss (PDL) from selected common port fibers to each add/drop fiber for the second embodiment optical switch.

Referring now to FIG. 8, there is illustrated a graph of simulated polarization dependent loss (PDL) for each add/drop fiber 67. Again, these data are measured for common port fiber displacements of 0, ±0.375 µm, ±0.875 µm from the optical axis. The PDL data represents the magnitude difference in optical power measured between the two orthogonal polarization components prior to recombination by walk-off crystal 77. That is, a PDL value of 0.08 dB indicates that one polarization component experiences a 0.08 dB greater loss than the orthogonal polarization component.

Figure 9:
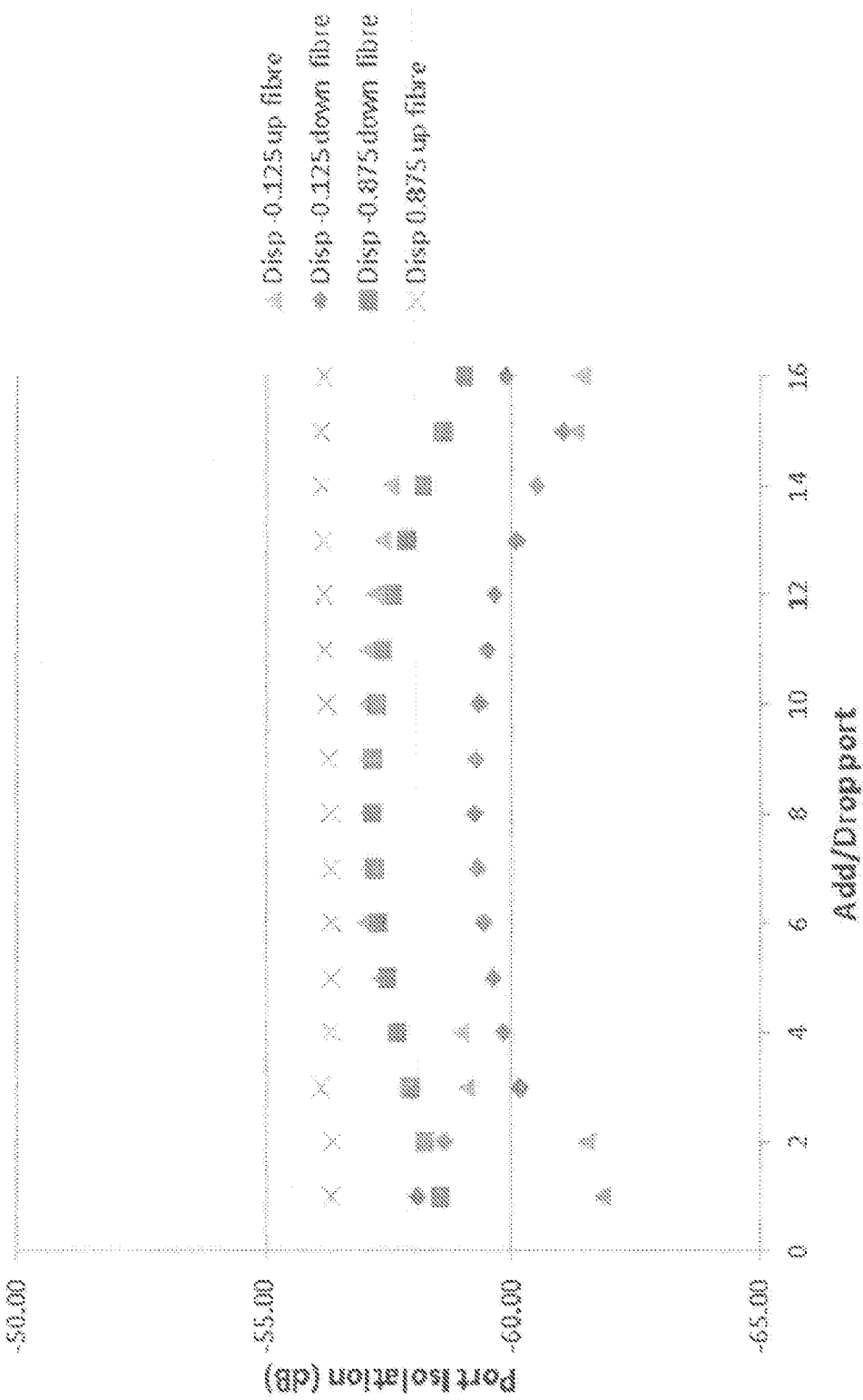
FIG. 9 is a graph of simulated port isolation from selected common port fibers to each add/drop fiber for the second embodiment optical switch.

Turning now to FIG. 9, there is illustrated a graph of simulated port isolation for each add/drop fiber 67. Data are measured for common port fiber displacements of 0.125 µm and 0.875 µm from the optical axis. "Up fibre" or "down fiber" respectively indicates whether the cross talk arises from the next adjacent fiber up or down in the array. Port isolation represents the degree to which a specific add/drop fiber is isolated from surrounding add/drop fibers. In particular, it represents the amount of cross talk or interference experienced at a fiber due to a signal transmitted to an adjacent fiber.

Figure 10:
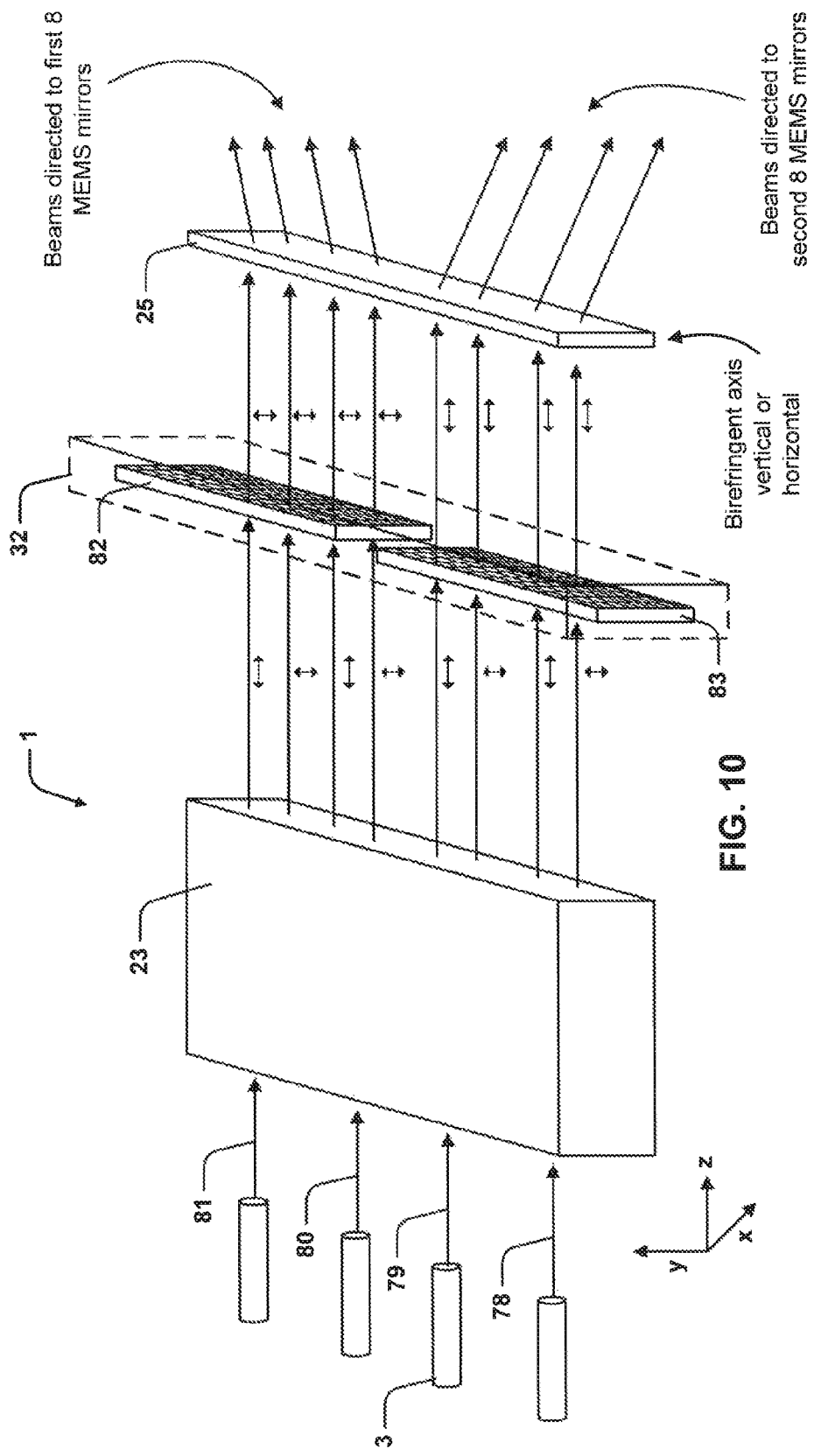
FIG. 10 is a schematic sectional view of the switch of FIG. 1 operating in a twin architecture.

So far switch 1 of FIG. 1 has been described in terms of a 4×16 operation. It is possible to configure switch 1 to operate in a twin architecture of dual 2×8 switches, which can be useful as a bidirectional switching node in a network. Referring to FIG. 10, which illustrates schematically a sectional view of switch 1, to implement a twin architecture, the beams 78 and 79 from two adjacent common port fibers are treated separately to the beams 80 and 81 from the other two common port fibers. This can be achieved by introducing one or more polarization modifying elements 32 into the optical paths of beams 78, 79, 80, 81 after walk-off crystal 23 and before the first wedge pair 25.

In the illustrated embodiment, polarization modifying element takes the form of two liquid crystal elements 82 and 83, each being electrically controllable to manipulate the phase and polarization of each beam in a predefined manner. Referring still to FIG. 10, by individually driving liquid crystal elements 82 and 83, the vertical polarization states from beams 78 and 79 can be changed to horizontal orientations while leaving the horizontal polarization states unchanged. Similarly, horizontal polarization components originating from fibers 80 and 81 are changed to vertical orientations while leaving the vertical polarization states unchanged. This gives rise to each sub beam from beam 78 and 79 being polarized with the same orientation, which is orthogonal to that of the sub beams from beams 80 and 81. Of course, the polarizations need not be restricted to vertical and horizontal but may be any orthogonal orientations.

The birefringent or slow axis of the first wedge pair 25 is oriented to be parallel to the sub beams of either beam pair 78, 79 or pair 80, 81 and perpendicular to the other. That is, either vertical or horizontal in FIG. 10. Upon propagation through wedge pair 25, the sub beams are not split but simply steered in a direction dependent upon the polarization and therefore dependent upon the incident common port fiber 3. Therefore, with one less beam splitting, at the output of beam splitter 5, there are only 8 pairs of parallel sub beams rather than the 16 illustrated in FIG. 3. However, the initial steering from wedge pair 25 directs the 8 sub beam pairs onto either a first 8 MEMS mirrors or a second 8 MEMS mirrors depending upon the specific common port fibers 3 from which the sub beams originated. These sub beam pairs are switched by the MEMS mirrors, recombined and directed to corresponding add/drop fibers. The remaining elements in switch 1 operate as explained above in relation to the 4×16 configuration.

As each MEMS mirror is linked to a corresponding add/drop fiber, 8 predetermined add/drop fibers are linked to input beams 78 and 79 and another 8 predetermined add/drop fibers are linked to input beams 80 and 81. As the switching is independent, the switching of beams 78 and 79 is independent from the switching of beams 80 and 81, thereby essentially defining two separate 2×8 switches within switch 1. Accordingly, in the twin 2×8 configuration, the independent switching allows 2 common port fibers to be used as inputs and the other two as outputs, thereby providing simultaneous bidirectional switching. With one less beam splitting than the 4×16 configuration, the twin 2×8 configuration has 3 dB less intrinsic signal power loss.

As the liquid crystal elements 82 and 83 are reconfigurable, the imposed polarization changes can be dynamically modified or switched on or off. In this way, switch 1 can be configured to change between a single 4×16 configuration and a twin 2×8 configuration. It will also be appreciated that the twin switch arrangement scales to other configurations and ratios of common port fibers and add/drop fibers. For example, an 8×16 configuration can be converted to a twin 4×8 configuration and vice versa.

For extra flexibility, elements 82 and 83 can be configured to selectively modify the polarization orientation of individual polarization states of each beam 78, 79, 80 and 81. In this way, the specific common port fibers that will be used for inputs and for outputs can be dynamically selected simply by altering the drive signals of elements 82 and 83. It will be appreciated that, in other embodiments, suitable polarization modification can be provided by other means such as by two or more separate half wave plates, which are disposed to modify the orientation of certain polarization states of each beam.

DESCRIPTION OF FURTHER EMBODIMENTS AND MODIFICATIONS

Figure 11:
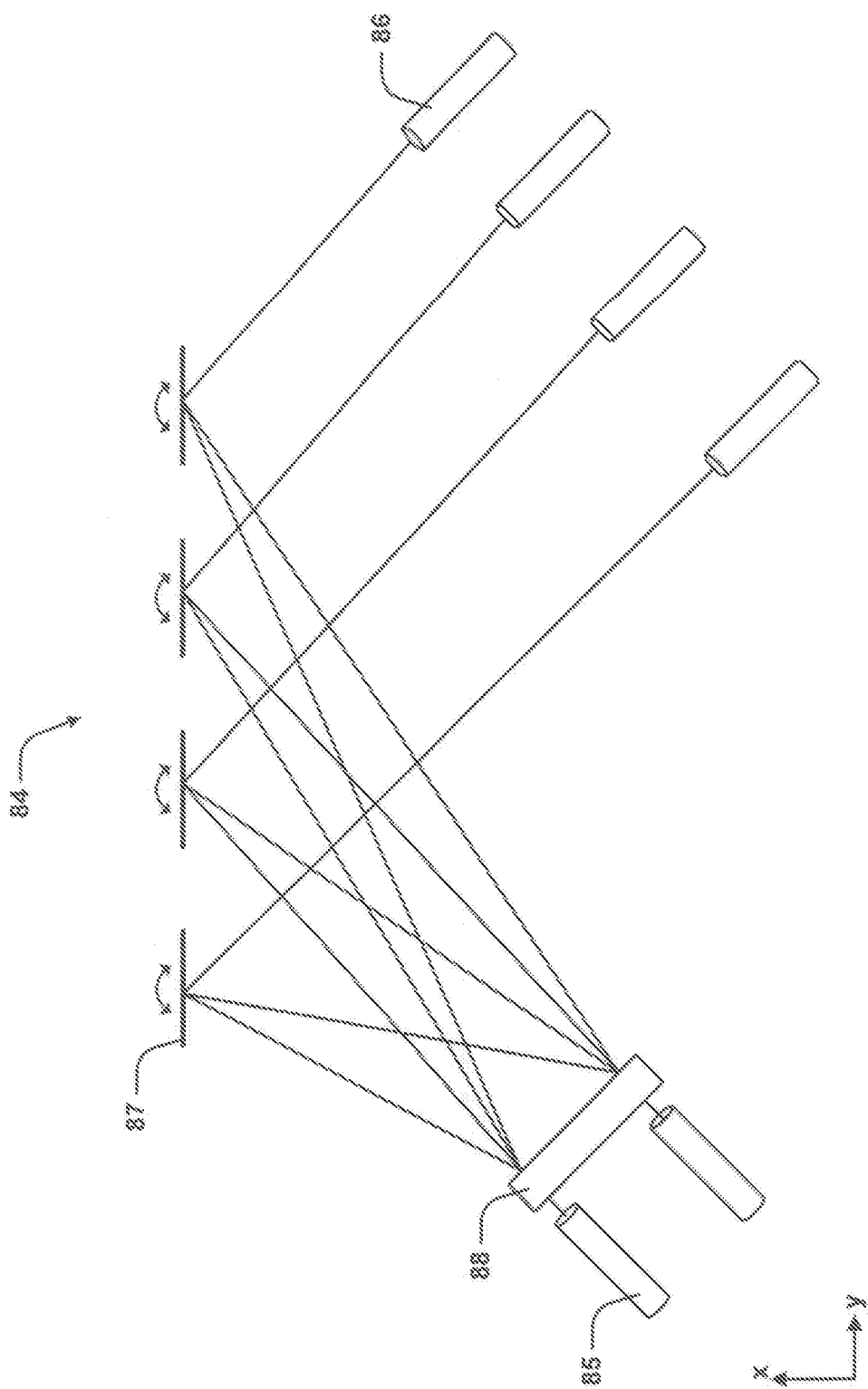
FIG. 11 is a schematic plan view of a further embodiment of an optical switch implementing a 2-by-4 fiber arrangement, with the beam splitter simplified to a schematic box.

Preferred embodiments of the invention have been disclosed above. However, it will be appreciated that the multicast optical switch can be embodied in various other forms. Referring to FIG. 11, there is illustrated schematically a more general embodiment switch 84 having 2 common port fibers 85 and 4 add/drop fibers 86. In this embodiment, both the common port fibers 85 and add/drop fibers 86 are disposed in arrays across a plane (x-y plane) and MEMS mirrors 87 also switch in that plane. FIG. 11 is illustrated to emphasise the core switching functionality of the multicast switch disclosed herein. While MEMS mirrors 87 are illustrated as the switching elements, it will be appreciated that other types of switching elements can be employed. For example, in one embodiment, a liquid crystal on silicon (LCOS) device having a one or two dimensional array of individually addressable pixels may be used as the switching unit. In this embodiment, sub beams are incident onto different regions of the LCOS device and the local pixels are electrically driven to impart a relative phase change across the sub beams, thereby steering the beams in a particular direction. Other forms of switching element can be implemented into other embodiments described above. Beam splitter 88 is illustrated as a simple box in FIG. 11 and can be one of a number of types, some of which are described below.

In the embodiments of FIGS. 1 to 6, optical beams are split into a number of sub beams corresponding to the number of add/drop fibers by the beam splitter in a polarization dependent manner. This particular beam splitter has advantages associated with polarization diversity and controlling polarization dependent loss. However, in other embodiments, different forms of beam splitters can be employed, each having their relative advantages and shortfalls.

Figure 12:
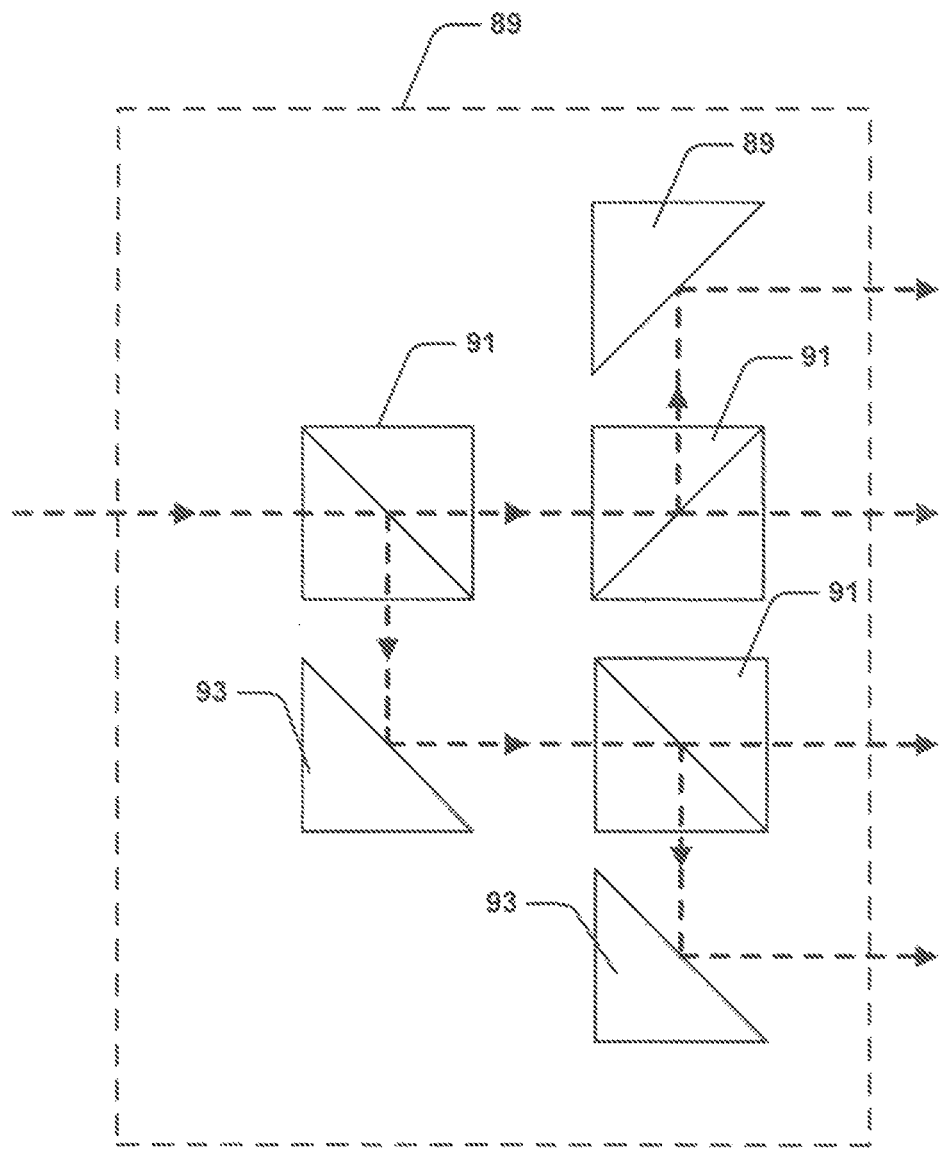
FIG. 12 is a schematic plan view of a further embodiment of a beam splitter, utilizing beam splitting elements and reflectors.
Figure 13:
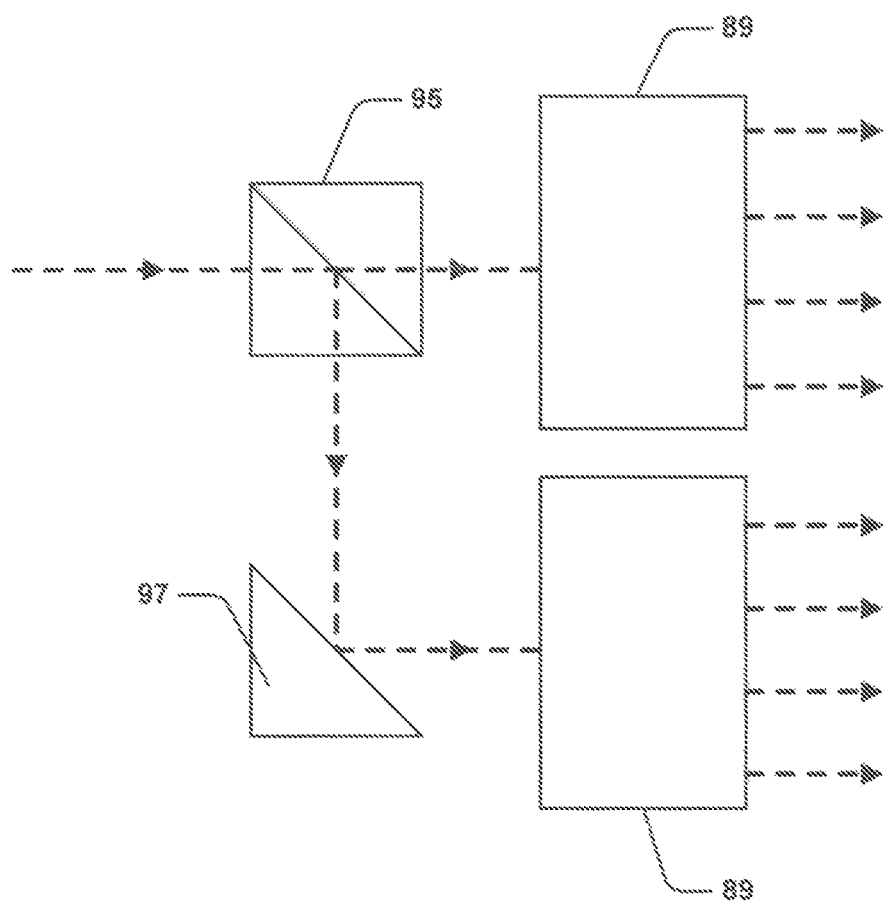
FIG. 13 is a schematic plan view of a system of two beam splitters of FIG. 12 combined to provide a higher order beam splitter.

Referring to FIG. 12, a further embodiment beam splitter 89 is illustrated. Splitter 89 includes a number of 50:50 beam splitting elements 91 and reflectors 93. The illustrated splitter 89 is configured to provide 4 output sub beams of substantially equal power. However, it will be appreciated that a larger or smaller number of outputs can be similarly incorporated by adding or removing beam splitting elements 91 and reflectors 93. Alternatively, referring to FIG. 13, a plurality of beam splitters 89 can be combined using one or more beam splitting elements 95 and reflectors 97 to provide a larger number of outputs. It will be appreciated that an arrangement such as that illustrated in FIG. 13 can be implemented with a variety of forms of beam splitter, including splitter 5 illustrated in FIG. 1. It will also be appreciated that other optical elements such as lenses and curved mirrors may be incorporated into arrangements of the like illustrated in FIG. 13 to manipulate the optical beams in a predefined manner.

Further embodiments that are suitable for implementation into the presently disclosed optical switch include one or more diffractive optical elements. Such "diffractive beam splitters" are known in the art and utilize a diffraction grating or other diffractive element to split an optical beam into a plurality of output beams. Depending upon the diffractive structure, the output beams are arranged in either a 1 or 2-dimensional array. Generally, each output beam possesses the same polarization, phase and spatial characteristics as the input beam.

In other embodiments, the optical switch includes one or more tap-off points in the optical system for monitoring optical beam powers and other characteristics at specific locations in the system. For example, in one embodiment, 2% optical power reflectors are inserted in the beam paths at suitable locations for tapping off a small monitor signal to photodiodes or other optical detectors. In configurations similar to FIG. 1, suitable locations for inserting tap-off monitors include, but are not limited to positions adjacent the micro lenses.

It will be appreciated that the particular arrangements of common port fibers and add/drop fibers is flexible and the fibers can be arranged in configurations other than those illustrated. However, different configurations require suitable changes in the beam splitting and switching processes. For example, common port and add/drop fiber arrays can be arranged parallel or in orthogonal dimensions. In one alternative configuration, both the common port fibers and add/drop fibers are disposed in the vertical y dimension but spaced apart by a predetermined distance in the horizontal x dimension or displaced in the y dimension. It will be appreciated that the specific arrangement of fibers will impact on the performance of the device, particularly in terms of port isolation and coupling efficiency.

In practice, common port fibers and add/drop fibers are optically coupled, via optical connectors, to lengths of optical fiber external to the optical switch. In one embodiment, these connectors optically couple signals from external lengths of optical fiber directly to the common port and add/drop fibers within the switch. However, in other embodiments, optical signals may be input directly from external fibers, through optical connectors to respective micro lenses.

The embodiments illustrated herein describe systems in reflection mode, wherein signals are reflected off MEMS mirrors. This provides advantages in reducing overall device size as the system length can be essentially halved and inputs located adjacent outputs. However, it will be appreciated that the multicast switch described herein can be realized in a transmission configuration wherein beams are transmitted through the switching element, rather than being reflected. An example of such a transmission switching element is a liquid crystal phase modulator.

While the above described embodiments do not provide wavelength selectivity, this can be provided by implementing suitable filters or a coherent detection system downstream of the optical switch. The optical switch is flexible and well suited for allowing this functionality to be included. If an input optical beam includes more than one wavelength channel, then the switch will simultaneously switch all of those channels to a corresponding output port. The individual channels can later be demultiplexed downstream of the switch. This separation of switching and filtering is advantageous in allowing the switches to be incorporated into networks having different or flexible channel plans.

In one particular further embodiment, the optical switch may be manufactured collectively with wavelength filters or other wavelength selective means to provide switching and wavelength selectivity in a single unit.

Conclusions

The above described optical switch provides a cost effective and non-complex means for simultaneously switching optical signals between a plurality of common port fibers and a plurality of add/drop fibers in a wavelength independent and directionless manner. A beam splitter divides the beams into sub beams for coupling to an array of selectively tiltable MEMS mirrors. The MEMS mirrors select the appropriate tilt position for coupling beams between preselected common port fibers and add/drop fibers. The switch is bidirectional in operation, allowing optical beams to be switched from common port fibers to add/drop fibers or from add/drop fibers to common port fibers. The switch is fully directionless in the switching sense such that beams from any common port fiber can be directed to any or all of the add/drop fibers and vice versa.

The particular design of the switch allows a single beam splitter to simultaneously split each input optical beam and ensures that propagation of the optical beams is primarily through free-space and is waveguide free. The ability to switch optical signals in free-space paths, as opposed to through dispersive media such as waveguides, is advantageous as optical loss, dispersion and other media dependent effects are reduced. Further, using a single beam splitter, consisting of a number of splitting elements disposed in series, provides for simultaneously splitting or recombining optical beams from all fibers. This design provides cost advantages over other known configurations of multicast switches, which require a separate beam splitter for each input fiber. Further cost advantages are realised in that the free space or waveguide free beam splitting allows for directional switching by a single array of MEMS mirrors rather than individual switches for each add/drop fiber.

Embodiments of the optical switch of the present disclosure include the following advantages:

Low optical loss due to the largely free-space design of the switch.

Very little wavelength dependence, allowing different optical channels to be switched equally. The switch is suitable for functioning in collaboration with separate wavelength selectivity means. This separation of switching and wavelength selection can be advantageous in optical systems for reducing complexity and improving system reliability.

Low manufacturing cost. The switch can be formed of well-known, cost effective components.

Low complexity of manufacture, which can give rise to a decrease in device failure and a reduction in manufacture time.

High polarization independence. The polarization of each optical beam is closely controlled throughout the optical switch, thereby reducing the effects of polarization dependent loss and other polarization related effects.

Interpretation

Throughout this specification, use of the term "element" is intended to mean either a single unitary component or a collection of components that combine to perform a specific function, purpose or collection of related functions or purposes.

Throughout this specification, use of the term "orthogonal" is used to refer to a 90° difference in orientation when expressed in a Jones vector format or in a Cartesian coordinate system. Similarly, reference to a 90° rotation is interpreted to mean a rotation into an orthogonal state.

Throughout this specification, use of the terms "polarization state" and "polarization component" are used interchangeably to describe a particular relationship between electric field vectors of an electromagnetic wave at a point in space and at a particular time. In particular, the polarization state of an electromagnetic wave is defined by the phase relationship between arbitrary orthogonal electric field vectors. Various polarization states are well known and defined in the field and include, linear polarization, circular polarization and elliptical polarization.

Use of the term "orientation" in this specification, in the context of polarization, refers generally to the geometric angular configuration of a particular polarization state. However, polarization states are, by convention, defined by phase relationships between electric field vectors. Therefore, use of the term orientation should extend also to other conventional polarization states, including elliptical polarization and circular polarization, which are not simply defined by geometric angles.

Throughout this specification, use of the term "waveguide" refers to longitudinal-type structures for guiding and confining light for propagation over distances, whether short or long. Examples of waveguides include but are not limited to optical fibers. It is not intended that the term "waveguide" refer to individual optical manipulating elements such as lenses and mirrors, which modify characteristics of optical beams but do not strictly confine those beams.

Reference throughout this specification to "one embodiment", "some embodiments" or "an embodiment" means that a particular feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of exemplary embodiments of the disclosure, various features of the disclosure are sometimes grouped together in a single embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Thus, while there has been described what are believed to be the preferred embodiments of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

We claim:

1. An optical switch configured to switch optical beams between one or more first ports and two or more second ports, said switch including:
   a wavelength independent beam splitter to simultaneously split said optical beams from each of said first ports into a plurality of separate sub beams; and
   a reflective wavelength independent switching unit to selectively reflectively direct each said sub beam along respective predetermined trajectories such that predetermined sub beams are coupled between said first and second ports, said switching unit including one independently switchable reflective element corresponding to each said second port, each said switchable reflective element being switchable between a plurality of preselected switching states, each said switching state defining a trajectory of each said sub beam;
   wherein said beam splitter and said switching unit are configured to direct said sub beams along substantially free space trajectories unconfined to waveguides.

2. An optical switch according to claim 1 including first and second polarization manipulating elements to respectively separate and recombine constituent orthogonal polarization states of each said optical beam such that each said polarization state traverses said beam splitter and said switching unit separately.

3. An optical switch according to claim 1 wherein said beam splitter includes one or more polarization beam separating elements.

4. An optical switch according to claim 3 wherein said beam separating elements are selected from the group comprising spatial walk-off crystals, birefringent wedges and polarization beam splitters.

5. An optical switch according to claim 3 wherein said beam splitter includes two or more pairs of birefringent wedges having a predefined birefringent axis and said axes of adjacently disposed wedge pairs are oriented relatively at 45°, said wedge pairs being situated adjacent one another and providing opposing material birefringent effects such that beams incident onto one of said wedge pairs are split into two angularly separated sub beams.

6. An optical switch according to claim 5 wherein each subsequent said wedge pair provides a larger angular separation of said sub beams.

7. An optical switch according to claim 6 wherein the angular deflection of each sub beam depends upon the incident angle of a previous order sub beam onto a previous wedge pair.

8. An optical switch according to claim 1 wherein said switching unit includes an array of independently tiltable micro-electromechanical system (MEMS) mirrors having one mirror corresponding to each said second port, wherein said MEMS mirrors are selectively tiltable into said a plurality of preselected switching states.

9. An optical switch according to claim 1 wherein said switching unit includes a liquid crystal on silicon (LCOS) device having a two-dimensional array of individually addressable pixels, predefined subsets of said pixels being configured to steer sub beams to corresponding second ports.

10. An optical switch according to claim 8 wherein a number of said switching states is equal to a number of said first ports, such that the particular switching state of each MEMS mirror determines the particular first port from which a sub beam will be coupled to a corresponding second port.

11. An optical switch according to claim 8 wherein said beam splitter splits each said optical beam into first and second groups of angularly separated sub beams, each sub beam within a respective group having a common polarization state that is orthogonal to the polarization state of the sub beams within the other group, the orthogonally polarized first and second groups being directed onto separate mirrors of said MEMS array.

12. An optical switch according to claim 11 including a polarization modifying element to modify the polarization state of said first group of sub beams such that said first and second groups of sub beams have the same polarization state.

13. An optical switch according to claim 11 including:
a first walk-off crystal disposed before or within said beam splitter to spatially separate orthogonal polarization components of said optical beams; and
a second walk-off crystal downstream of said switching unit to recombine said orthogonal polarization components.

14. An optical switch according to claim 13 wherein said beam splitter is configured such that said polarization components emerge from said beam splitter as pairs of parallel sub beams having the same polarization state and forming said first and second groups of angularly separated sub beams.

15. An optical switch according to claim 14 including a half-wave plate located adjacent and upstream of said second walk-off crystal to change the polarization of a subset of said sub beams to an orthogonal state to thereby allow spatial recombination of all said sub beams corresponding to a particular optical beam.

16. An optical switch according to claim 14 including a first optical power element configured to collimate said sub beams onto said switching unit and to focus both said polarization components of each optical beam onto a single MEMS mirror.

17. An optical switch according to claim 16 further including a second optical power element to collimate said sub beams prior to coupling to said second ports.

18. An optical switch according to claim 1 wherein said switch is simultaneously bidirectional in operation such that, in a first operational direction, optical beams can be switched from said first ports to predetermined ones of said second ports and, in a second operational direction, optical beams can be switched from said second ports to predefined first ports, wherein the switching can occur simultaneously in both directions.

19. An optical switch according to claim 18 including at least one polarization modifying element to selectively modify the polarization state of one or more beams to separate beams from said first and second subsets.

20. An optical switch according to claim 19 wherein said polarization modifying element includes one or more liquid crystal phase modulator elements configured to individually manipulate predetermined ones of said optical beams.

21. An optical switch according to claim 19 wherein said polarization modifying element is dynamically variable such that said optical switch can be changed between a bidirectional operational mode and a unidirectional operational mode.

22. An optical switch according to claim 1 configured to simultaneously split a plurality of input optical beams into a plurality of output sub beams angularly separated according to polarization state.

23. A method of switching optical beams between one or more first ports and two or more second ports, said method including:
simultaneously splitting said optical beams into a plurality of separate sub beams in a wavelength independent manner;
defining paths between predetermined ones of said first and second ports for each said sub beam; and
utilizing a switching unit to selectively direct each said sub beam along respective said paths such that information contained within each said optical beam is transmitted between respective said first and second ports, said switching unit including one independently switchable reflective element corresponding to each said second port, each said switchable reflective element being switchable between a plurality of preselected switching states, each said switching state defining a trajectory of each said sub beam;
wherein said switching unit is configured to direct said sub beams along substantially free space trajectories unconfined to waveguides.

24. An optical multiplexer for mapping a series of optical input ports to a series of optical output ports in a controlled manner, said multiplexer including:
a series of input ports configured to emit one or more optical beams;
an optical power splitting element to split each said optical beam into subcomponent beams;
a first optical power element to collimate said subcomponent beams onto a directional element, and to refocus said subcomponent beams;
a directional element to provide a controllable directional projection to said subcomponent beams to provide directed subcomponent beams, said directional element including one independently switchable reflective element corresponding to each said optical output port, each said switchable reflective element being switchable between a plurality of preselected switching states, each said switching state defining a trajectory of each said subcomponent beam;
a second optical power element to collimate said directed subcomponent beams for coupling to said optical output ports.

* * * * *